United States Patent [19]
Hooper

[11] 3,945,236
[45] Mar. 23, 1976

[54] FORMATION OF SEGMENTS FOR CONTAINERS AND THE LIKE

[75] Inventor: Harry Hooper, Brookfield, Wis.

[73] Assignee: C-R-O Engineering Co., Inc., Brookfield, Wis.

[22] Filed: Oct. 3, 1974

[21] Appl. No.: 511,502

[52] U.S. Cl.............. 72/340; 220/3; 220/5 R; 228/184
[51] Int. Cl.² .................................. B21D 28/00
[58] Field of Search ........ 220/3, 5 R, 5 A; 261/119, 261/72; 113/120 S; 29/455, 469; 72/340, 342; 83/14, 15, 23, 40; 29/471.1, 463, 464

[56] References Cited
UNITED STATES PATENTS

| | | | |
|---|---|---|---|
| 1,966,241 | 7/1934 | Furrer | 113/120 S |
| 2,050,326 | 8/1936 | Hopkins | 113/120 S |
| 2,579,646 | 12/1951 | Branson | 220/3 |
| 2,731,334 | 1/1956 | Wissmiller et al. | 29/471.1 |
| 2,948,061 | 8/1960 | Carstens | 220/5 A |
| 3,024,938 | 3/1962 | Watter | 220/3 |
| 3,046,647 | 7/1962 | Carstens | 29/471.1 X |
| 3,052,021 | 9/1962 | Needham | 220/3 |
| 3,445,918 | 5/1969 | Romanos | 29/471.1 |

Primary Examiner—C. W. Lanham
Assistant Examiner—James R. Duzan
Attorney, Agent, or Firm—Andrus, Sceales, Starke & Sawall

[57] ABSTRACT

A flat metal plate is first formed into a suitable segment of a large generally spherical body. It is then properly positioned on a horizontal cradle and its edges cut vertically as if from infinity, i.e. so that they are all parallel. A cutter then traverses the pre-cut edge to form the proper contour for welding. The pre-cut edge itself forms an accurate fixed reference and cooperates with guides on the face of the curved plate to keep the axis of the milling cutter tool substantially perpendicular to the surface of the plate at the point of milling contact. When all segments are so made and then joined, the resultant generally spherical body will be within substantially closer tolerances.

3 Claims, 9 Drawing Figures

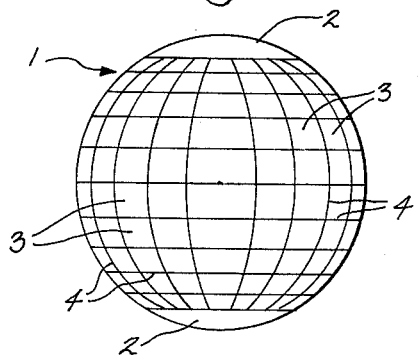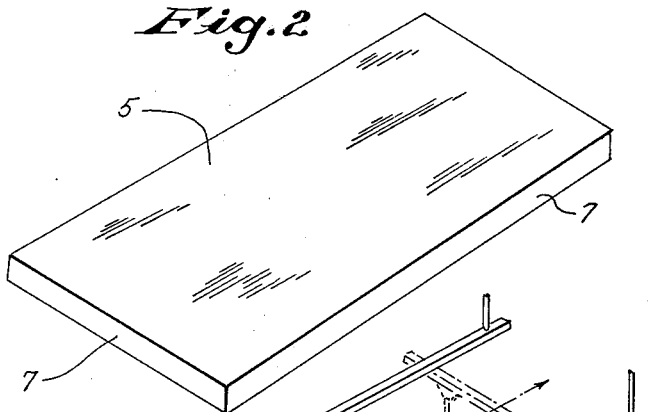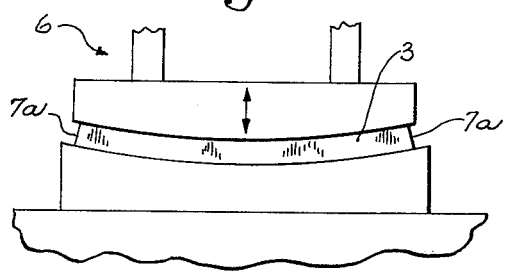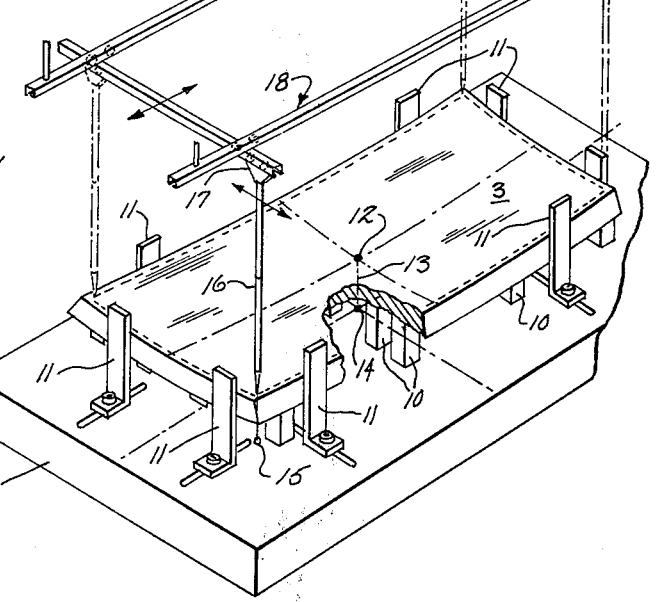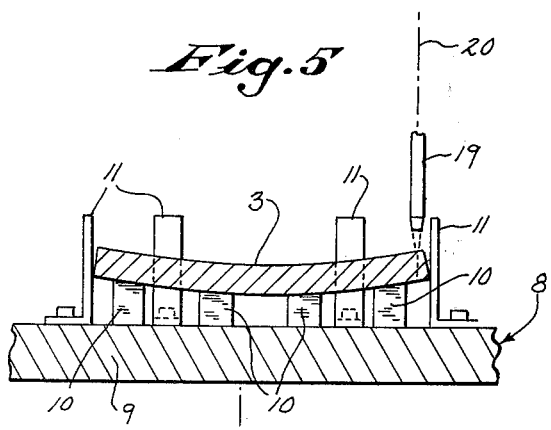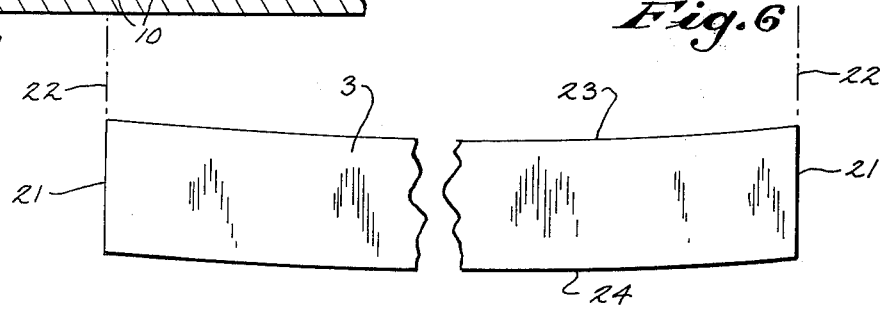

FORMATION OF SEGMENTS FOR CONTAINERS AND THE LIKE

BACKGROUND AND SUMMARY OF THE INVENTION

This invention relates to the formation of segments for substantially spherical containers and the like.

In the art of handling liquified natural gas and other similar materials, the gas is often stored in liquid phase in very large generally spherical containers fabricated from aluminum. These containers comprise a pair of end caps and a plurality of segmental plates which are welded together along seams which, in effect, define latitude and longitude lines.

Heretofore, it has been found to be very difficult to accurately join the segments, because of their curved nature and because of their relatively large size, such as 12 feet × 50 feet. It has been difficult to form the segments accurately, since a segment presents a compound curvature and it is difficult to know in forming exactly where its edge is. The resultant tolerances for the sphere have therefor been larger than desired.

The present invention solves the previous forming problems. In accordance with the invention, a flat metal plate is first formed into a suitable segment of a large generally spherical body. It is then properly positioned on a horizontal cradle and its edges cut vertically as if from infinity, i.e. so that they are all parallel. A cutter then traverses the pre-cut edge to form the proper contour for welding. The pre-cut edge itself forms an accurate fixed reference and cooperates with guides on the face of the curved plate to keep the axis of the milling cutter tool substantially perpendicular to the surface of the plate at the point of milling cutter contact. When all segments are so made and then joined, the resultant generally spherical body will be within substantially closer tolerances.

BRIEF DESCRIPTION OF THE DRAWINGS

The accompanying drawings illustrate the best mode presently contemplated by the inventor for carrying out the invention.

In the drawings:

FIG. 1 is a schematic side elevation of a large tank for storing liquid natural gas or the like;

FIG. 2 is a perspective view of a flat plate prior to forming;

FIG. 3 is a schematic end view showing the forming of the plate into a segment of a sphere;

FIG. 4 is a schematic perspective view of a cradle and segment centering device;

FIG. 5 is a schematic end view showing flame or plasma cutting of the edges of the spherical segment, as if from infinity;

FIG. 6 is an enlarged fragmentary edge view of the segment, as first cut;

DESCRIPTION OF THE PREFERRED EMBODIMENT

Figure 7:
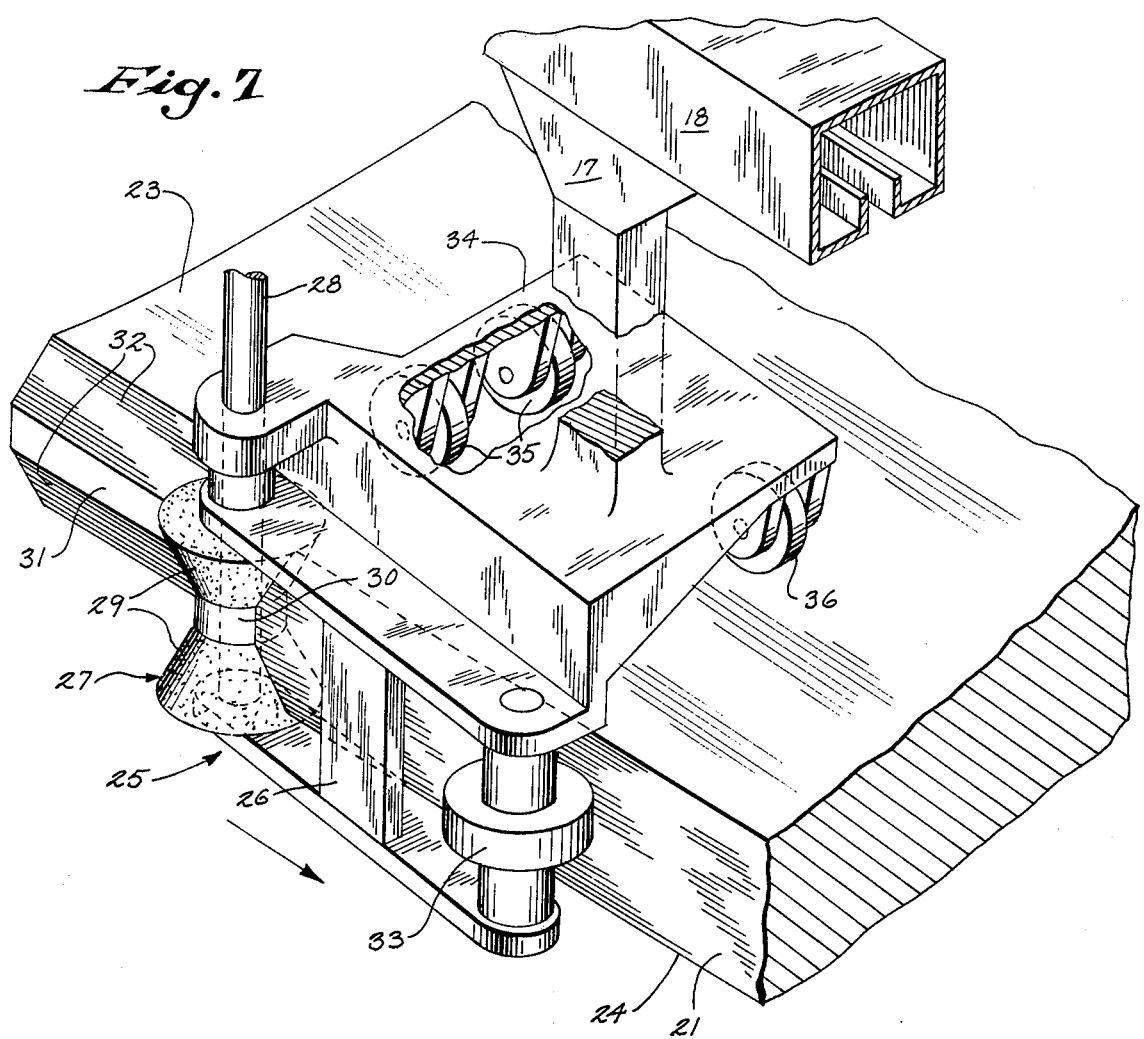
FIG. 7 is a schematic perspective view, showing the further cutting of the segment edge, and showing the edge and surface guides.

The invention is contemplated for use in the accurate formation of substantially spherical bodies, and is presently envisioned for use in the fabrication of very large containers 1 having end caps 2 and a plurality of segments 3; all of which are joined together by seam welds 4 to form the completed container.

As shown in FIGS. 2 and 3, each finished segment 3 has its origins in a flat metal plate 5, which is formed in a suitable press 6 to the desired curvature. Although the plurality of peripheral edges 7 of plate 5 are shown as generally perpendicular to the plate faces, the act of press forming causes these edges to change their relationship to the segment faces, which have a compound curve. The changed non-perpendicular edges are shown in FIG. 3 as 7a and are angular to the vertical.

At this point in the operation, the segment edges 7a are only in rough form and must be further processed. For this purpose, and as schematically shown in FIG. 4, segment 3 is placed on a cradle 8 comprising a base 9 with a plurality of vertically extending surface supports 10 and a plurality of horizontally adjustable edge-engaging stops 11.

It is important for purposes of final accuracy that the center point 12 of segment 3 is on the same vertical axis 13 as the center point 14 of cradle 8 so that the centers, in effect, coincide vertically. This is assured by providing a reference or bench mark 15 on cradle 8 which has a known positional relationship with point 14. A marking tool 16 is mounted on a support bracket 17 of an overhead carriage 18 of any suitable well-known type. A suitable drive, not shown, for carriage 18 functions to move tool 16 to any position relative to longitudinal and transverse axes. In this instance, the drive is programmed to move tool 16 along the periphery of an imaginary generally spherical segment which is properly centered. As the tool moves along the edge of actual segment 3, if it falls off it is apparent that segment 3 is not properly centered and stops 11 are adjusted accordingly so that the edges of the real and imaginery plate conform.

As soon as segment 3 is centered, tool 16 is replaced with a cutting means, such as a plasma torch 19 (FIG. 5) which is also mounted on bracket 17 so that its axis 20 is vertical. Torch 19 is then traversed around the periphery of segment 3 on the same path as tool 16, and at each point cuts the edge as if from infinity. That is, all four faces 21 of the cut segment edges are in vertical mutually parallel planes 22. See also FIG. 6 which shows an end view of a cut segment. By so cutting the edges, they form in their entirety a suitable known reference to the compound curved top and bottom surfaces 23, 24 of segment 3.

Subsequent to forming of the reference edges, they are then formed into a final contour preparatory to welding of adjacent segments. For this purpose, a follower-cutter assembly 25 is fixedly mounted, either to bracket 17 on carriage 18, as shown, or to the carriage of a suitable machine tool capable of performing the desired function.

As best shown in FIG. 7, assembly 25 comprises a rigid framework 26 on which is mounted a milling cutter tool 27 having a generally vertical axis and driven through a rotary drive shaft 28 by a motor, not shown. Cutter 27 comprises a pair of bevel cutting surface 29 joined by a smooth cylindrical central guide portion 30.

As shown, the cutter contour is for the purpose of creating a plate edge including a central uncut strip 31 which joins two angular portions 32. This is for making a K-type weld. Other edge contours, such as for I, V, X or Y type welds, may be formed without departing from the spirit of the ivention.

The smooth guide portion 30 of cutter 27 follows reference edge 21 and serves to limit penetration of the cutter into the plate. The portion 30 establishes the correct geometry between the uncut reference edge 31 and the cut angular surfaces 32.

A stabilizing guide roller 33 is fixedly mounted to frame 26; is mounted on a generally vertical axis; and engages either reference edge 21 or 31, depending upon whether the roller is disposed fore or aft of cutter 27. As shown, roller 33 is mounted ahead of the cutter.

In addition, there is provided means for simultaneously following one of the compound contoured surfaces 23, 24 of the segment closely adjacent milling cutter 27. For this purpose, a bracket 34 forms an extension of framework 26 and in this instance lies over top face 23. Bracket 34 supports a pair of spaced generally horizontal axis guide roller-followers 35 which are fixed relative to roller 33 and tool 27 and are maintained in continuous rolling engagement with surface 23. An additional horizontal axis stabilizing roller 36 is mounted on frame 26 and also engages surface 23. A three point contact by rollers 35 and 36 is thus created, forming a plane which is perpendicular to cutter axis shaft 28 and substantially parallel to surface 23. Since the surface 23 is very close to being flat due to the extremely large size of the substantially spherical segment, the axis of the tool 27 will be held substantially perpendicular to surface 23 adjacent the point of cutter contact at all times during this cutting operation.

Figure 8:
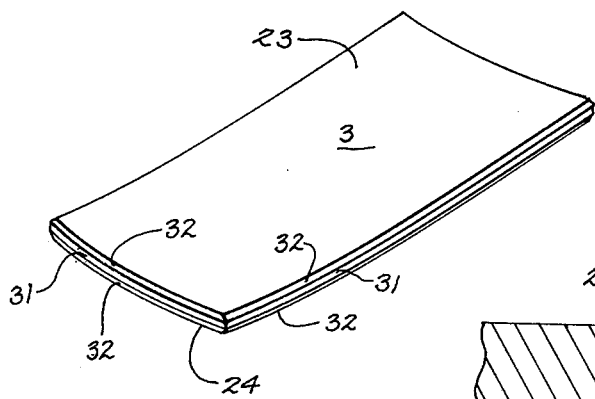
FIG. 8 is a perspective view of the finished segment.
Figure 9:
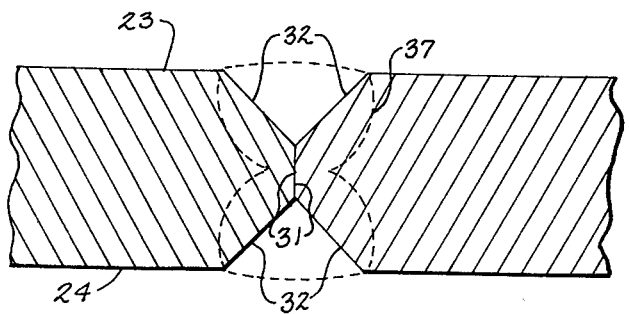
FIG. 9 is an enlarged schematic section showing the two adjacent segments set up for welding.

The resultant finished spherical segment is shown in FIG. 8. The edges of adjacent segments will be substantially identical, and can be joined for seam welding (FIG. 9) in a much more accurate manner than previously possible. The dotted area 37 shows the weld area.

Various modes of carrying out the invention are contemplated as being within the scope of the following claims particularly pointing out and distinctly claiming the subject matter which is regarded as the invention.

I claim:

1. The method of forming a compound curved plate-like segment for edge attachment to a like segment for use in manufacturing a large body of substantially spherical contour, said method comprising the steps of:
    a. forming a plate into a segment having top and bottom surfaces of compound curvature and having a plurality of angular peripheral edges,
    b. placing said plate in a generally horizontal position,
    c. cutting said peripheral edges as if from infinity to form edge faces, the planes of which are vertical and mutually parallel and which form fixed references relative to said surfaces,
    d. and subsequently contour-cutting along said formed edge faces with a cutting tool while following said edge faces in a manner to guide the tool and control its depth of cut, and while simultaneously following at least one of said surfaces in a manner to maintain the tool axis substantially perpendicular to the said followed surface adjacent the point of tool contact with the edge face.

2. The method of forming a compound curved plate-like segment for edge attachemnt to a like segment for use in manufacturing a large body of substantially spherical contour, said method comprising the steps of:
    a. forming a plate into a segment having top and bottom surfaces of compound curvature and having a plurality of angular peripheral edges,
    b. placing said plate in a generally horizontal position in a cradle,
    c. centering said plate relative to said cradle,
    d. cutting said peripheral edges as if from infinity so that the planes of the cut edges are vertical and mutually parallel, whereby said cut edges form fixed references relative to said surfaces,
    e. and subsequently contour-cutting along said cut edges with a cutting tool while:
        1. following said cut edges to control the depth of cut of the tool,
        2. and simultaneously following at least one of said surfaces in a manner to maintain the tool axis substantially perpendicular to the said followed surface adjacent the point of tool contact with the segment edge.

3. The method of claim 2;
    a. in which the centered position of said plate in said cradle is obtained by moving a marking tool along the edge of said plate on a path dictated by an imaginary centered plate, and adjusting said first-named plate so that it's edges conform to those of said imaginary plate,
    b. and in which said peripheral edges are cut as if from infinity by traversing a cutting tool along the same path as said marking tool.

* * * * *